United States Patent [19]

Holland

[11] Patent Number: 4,617,875
[45] Date of Patent: Oct. 21, 1986

[54] GROOMING AND TREATMENT APPLICATOR

[76] Inventor: Linda L. Holland, 1319 Nonchalant Dr., Simi Valley, Calif. 93065

[21] Appl. No.: 746,183

[22] Filed: Jun. 18, 1985

[51] Int. Cl.⁴ .................. A01K 13/00; A45D 24/22
[52] U.S. Cl. .................................... 119/85; 132/114
[58] Field of Search .................................... 119/83–94; 132/113, 114

[56] References Cited

U.S. PATENT DOCUMENTS

| | | | |
|---|---|---|---|
| 819,444 | 5/1906 | Monroe | 132/114 X |
| 2,132,820 | 10/1938 | Dunaway | 119/85 |
| 2,517,152 | 8/1950 | Wilson | 132/114 X |
| 3,059,259 | 10/1962 | Peilet et al. | 119/88 X |
| 4,213,423 | 7/1980 | Bryan et al. | 119/86 |
| 4,543,913 | 10/1985 | Wilkeson | 119/85 |

*Primary Examiner*—Hugh R. Chamblee
*Attorney, Agent, or Firm*—Poms, Smith, Lande & Rose

[57] ABSTRACT

A versatile grooming and treatment applicator includes a circular housing for containing a liquid or powder, for example, for skin treatment, or insecticide, or a shampoo, with the housing including a flat circular face with a peripheral lip and several spaced openings extending through the face. Several alternative applicator face plates or heads are provided, with each having a brush, sponge, or other similar surface for engaging the hair, and with the face plates carrying nozzles extending for a distance substantially equal to the extremity of the brush or sponge, for example, and overlying the spaced openings. The nozzles may be selectively sealed, or opened to mate with the opening in the housings, by rotation of the face plates using an actualator lever. Arrangements are provided for rotatably and removably holding the face plates or heads on to the housing, for securing a strap to the housing for extending around the back of a person's hands, and for filling the housing with fluid or powder.

17 Claims, 9 Drawing Figures

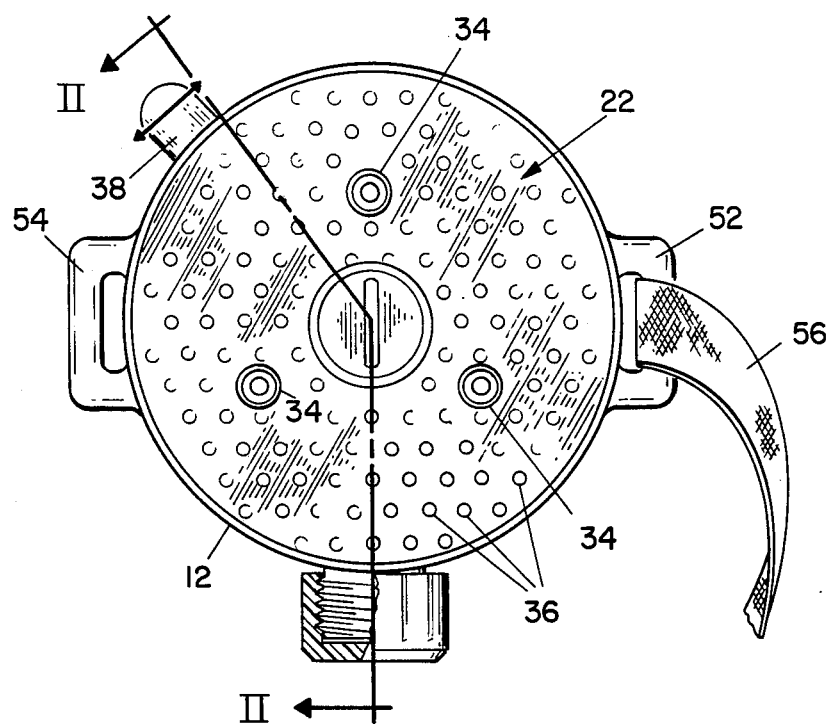
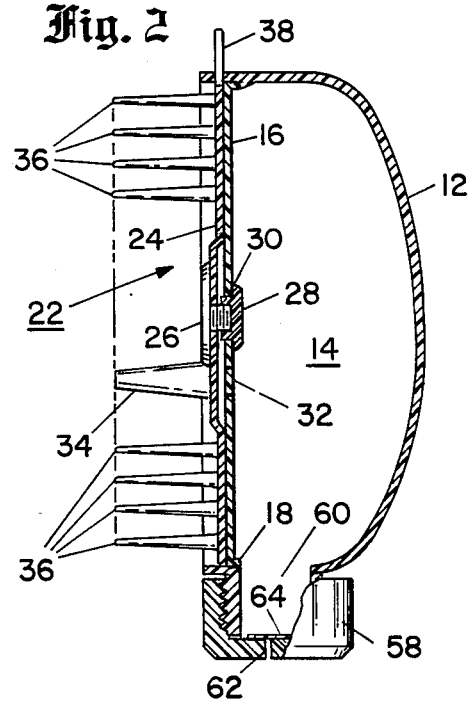

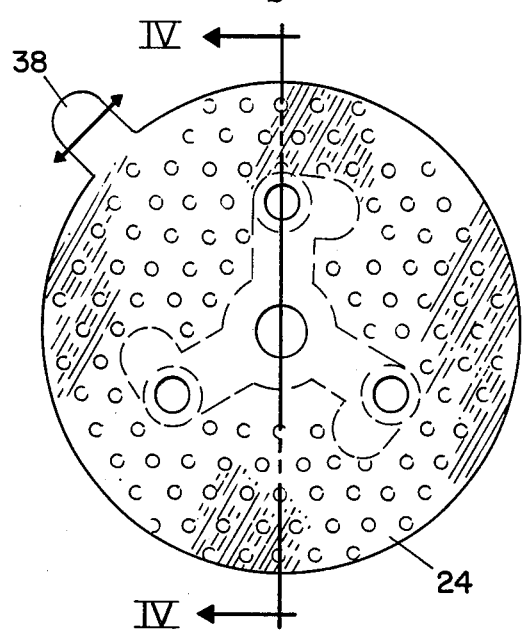
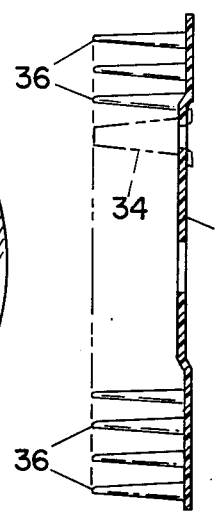
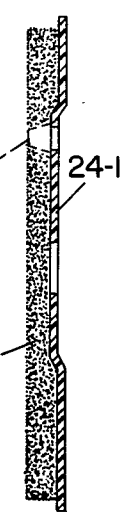
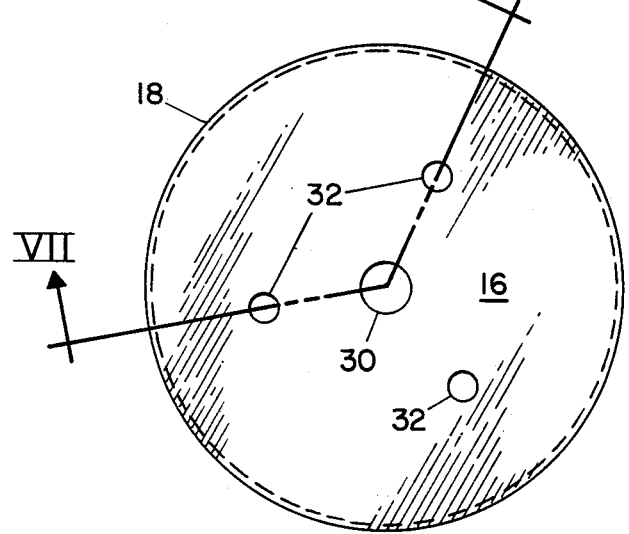
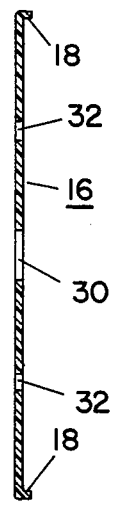
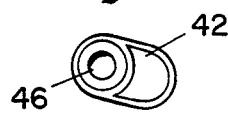

GROOMING AND TREATMENT APPLICATOR

FIELD OF THE INVENTION

This invention relates to an applicator for not only grooming, but also treating the hair and/or skin covered by hair.

BACKGROUND OF THE INVENTION

When it is desired to apply a medication, flea powder or the like to an animal such as a dog or horse for example, it is customary to use either a spray dispenser, or a powder rubbing the powder into the animal's fur or hair, using one's hand. However, when an aerosol can is employed for application, it produces an unexpected sound, and will often make the animal frightful or jittery. In addition, neither of the two methods of application as described hereinabove are useful for applying the medication or treatment to the skin of the animal. Certain brushes and/or combs have been proposed for the purpose, for example note U.S. Pat. Nos. 2,574,130, and 4,237,822. However, the devices shown in these patents have drawbacks in that they are either ineffective to apply the treatment or medication to the desired location, or are unduly expensive and complicated.

Accordingly, a principal object of the present invention is to provide a grooming and treatment applicator which will not frighten the animals or make them jittery, and one which may be readily controlled, is simple and inexpensive, and will serve to apply the desired material to the desired location, either on the skin, underneath the hair, or on the surface of the hair as appropriate for the particular material being applied.

SUMMARY OF THE INVENTION

In accordance with the present invention a housing is provided which has a hollow body for storing material to be applied to the skin, or to hair, requiring treatment. The housing includes arrangements for receiving alternative combined treatment and grooming applicator heads, and has openings directed to the place where the alternative heads are to be secured, through which the treatment material is to be dispensed. Various heads may be alternatively provided while with each head having an outer surface for grooming or engaging the hair or skin, and a plurality of nozzels extending outwardly from the base of the head substantially coextensive with the outer surface thereof which is to engage the hair or the skin. Arrangements are provided for shifting the position of the head relative to the housing, to either align the nozzles with the dispensing openings in the housing, or to block them, with resilient material engaging the openings to provide for sealing thereof, when the holes are blocked.

In accordance with one aspect of the invention, the alternative heads could, for example, include outwardly extending bristles, with the nozzles extending substantially the same distance as the bristles, or a spongy surface, with, again, the nozzles extending to the same general height as the outer surface of the sponge, for ease of application of the treatment material in each case.

In a preferred embodiment of the invention, the heads may be circular, to conform with the shape of the housing, and the heads may be pivotally mounted centrally, and may have an actuator lever rotating the head to either align the nozzles with the dispensing openings, or to shut them off, when dispensing action is no longer desired.

The housing may be provided with two loops to which a strap may be engaged for encircling the back of a person's hand, to facilitate holding the housing while it is being used.

In accordance with another feature of the invention, the housing may be at least partially flexible, whereby the treatment material may be urged out of the housing by squeezing it.

An important advantage of the present invention is that, when it is used with animals, the applicator feels like a brush or other grooming device with which the animal is familar so that the application of the treatment proceeds without frightening or upsetting the animal. An additional advantage is the versatility of the device with the availability of different heads, so that the material may be applied either to the outer surface of the hair by using a sponge and shorter nozzles, for example, or to the skin below the hair, by using longer bristled brushes, and elongated nozzles, so that full penetration to reach the skin, is practical and easily accomplished.

Other objects, features and advantages of the invention would become apparent from a consideration of the following detailed description, and from the accompanying drawings.

BRIEF DESCRIPTION OF THE DRAWINGS

FIG. 1 is a front view of an applicator embodying the principles of the invention showing a head with bristles attached thereto mounted in place on the applicator housing;

FIG. 2 is a cross-sectional view taken along lines II—II of FIG. 1;

FIG. 3 is a view of the inner side of a head of the type shown in FIG. 1;

FIG. 4 is a cross-sectional view taken along lines IV—IV of FIG. 3;

FIG. 5 is a cross-sectional view of an alternative head which may be employed in accordance with the present invention, in which the applicator is of spongy configuration, and has relatively short nozzles to extend to the surface of the spongy layer;

FIG. 6 is a plan view of the plastic sheet material forming part of the housing, and showing the openings through which the treatment material is applied to the nozzle;

FIG. 7 is a cross-sectional view of the plate of FIG. 6;

FIG. 8 is a rear view of a rubber member which seals the housing when material is not being expelled through the openings; and FIG. 9 is a cross-sectional view of one of the nozzles employed of the device of FIG. 1.

DETAILED DESCRIPTION

Referring more particularly to FIGS. 1 and 2 of the drawings, the grooming and treatment applicator includes an outer housing 12 having an enclosed space 14, where insecticide powder, a skin rash treatment fluid, or even shampoo, may be contained. The front of the housing 12 is closed by a generally flat plate 16 having outer edges, 18 which are bonded to the inside of the peripheral walls of the housing member 12. Incidentally, plate 16 is shown separately in FIGS. 6 and 7.

Now, returning the FIGS. 1 and 2, secured to the front of the housing in engagement with the faceplate 16, is a removable applicator head assembly 22, having a circular backing plate 24 which is rotatably mounted at its center by the screw 26 which engages matching internal threads in the plastic member 28 which is bonded in place through an opening 30 in the center of the plate 16, forming the front portion of the housing. The plate 16 is provided with three openings 32 which are aligned with the nozzles 34 which extend outwardly from the plate 24 for substantially the same distance as the bristles of 36 which are mounted on the plastic plate of 24 of the applicator head 22.

The flow of treatment fluid or powder through the nozzles 34 from the chamber 14 may be controlled by actuating the lever 38 either clockwise or counterclockwise to shift the position of the nozzles 34 relative to the openings 32. In one of the two positions the nozzles 34 are lined up with the openings 32; and when the actuator 38 is shifted to its alternative position, flat rubber members forming part of the assembly of 32 as shown in FIG. 8, block the openings 32, so that no fluid or powder may flow from the chamber 14 through the nozzles 34. The positions of the elements 42 on the applicator head support plate 24 are shown to advantage in FIG. 3 of the drawings. The nozzle 34 as shown in FIG. 9, is provided with a recess 44 which fits into the hole 46 of the rubber element 42, with the sides of the hole 46 expanding when the rubber nozzle is forced through it, so that the middle edges of the surrounding rubber fit into the recess 44 making a tight seal, once assembly has been accomplished.

Now turning to other aspects of the design, the housing 12 may be provided with a pair of integral loops 52 and 54 for receiving a strap 56 which extends over the back of the hand, to facilitate holding the applicator assembly, when it is being used to groom and/or to apply treatment material. It should also be noted that the volume 14 within the housing 12 may be filled by removing the cap 58 which closes the opening 60. A vent 62 opening to an integral one-way valve flap 64 may be provided to facilitate the flow of treatment material through the nozzles 34, without the possibility of the development of a lower pressure region within the chamber 14 which might otherwise inhibit the flow of fluid or powder.

As mentioned above, the applicator heads are removable and interchangeable. One applicator head with long bristles has been shown in FIGS. 1, 2 and 4 of the drawings. An alternative applicator head, shown in FIG. 5, is provided with a relatively thinner layer of a spongy material 62, and shorter nozzles 34-1, extending approximately to the outer surface of the spongy material 62, with both the sponge layer 62 and the nozzles 34-1 being mounted on the interchangeable base plate 24-1. The arrangement with the longer bristles and the longer nozzles as shown in FIG. 4 is particularly useful when it is desired that the treatment material be applied to the skin; whereas the applicator head with the shorter nozzles, and the spongy material, may be used when the treatment material is to be applied to the outer surface of the hair being treated. It is also noted that the sponge assembly of FIG. 5 may be employed with a continuous sponge layer and no nozzles but only apertured rubber sealing members as shown in FIG. 8 so that, when the head is rotated to permit fluid flow, the sponge becomes saturated with the fluid. Also, with the easily removvble and replaceable applicator heads, other applicator head configurations may of course, be employed. Thus, by way of example but not limitation, applicator heads may be provided with metal wire brush elements, or with longer resilient elements or massage purposes or the like.

In conclusion, it is noted that the foregoing detailed description and accompanying drawings relate to e illustrative embodiments of the invention. It is to be understood, however, that various alternatives may be employed, without departing from the spirit and scope of the invention. Thus, by way of example, but not of limitation, the face of the applicator housing may be of generally rectangular, with the interchangeable applicators being slideable for short distance along the length of the applicator, with the nozzles lined up with the underlying openings in one extreme position of movement of the head with respect to the underlying housing face plate, and being sealed against fluid flow in the other extreme location of the applicator heads. In addition, alternative venting arrangements instead of those shown in FIG. 2 of the drawings, may be employed. Further, instead of being flexible, the housing 12 may be rigid, with the flow of powder or fluid being accomplished by gravity flow rather than by squeezing. Accordingly, it is to be understood that the present invention is not limited to that precisely as shown in the drawings and as described in detail hereinabove.

What is claimed is:

1. A versatile combined grooming and treatment applicator assembly comprising:
    a circular housing for containing liquid or powder, said housing including a flat circular face with a peripheral lip and a plurality of spaced openings extending therethrough;
    a plurality of applicator face plate units, each having outwardly extending means for engaging the skin or hair of a body, said face plates units having nozzles extending to the extremity of said outwardly extending means and overlying said spaced openings;
    means for shutting off said nozzles and sealing said openings by rotating said face plate units;
    means for removably and rotatably securing said faceplate units to said flat circular face within said lip;
    means for securing a strap to said housing for extending around the back of a person's hand; and
    means for filling said housing with fluid or powder for application to the skin or hair of a body.

2. A versatile combined grooming and treatment applicator assembly as defined in claim 1 wherein one of said applicator face plate units includes bristles forming a brush extending outwardly from said housing when said faceplate unit is assembled to said housing.

3. A versatile combined grooming and treatment applicator assembly as defined in claim 1 wherein one of said applicator face plate units includes a layer of spongy material on the surface thereof away from said housing.

4. A versatile combined grooming and treatment applicator assembly as defined in claim 1 wherein said shutting off means includes an actuator arm extending radially outwardly from each said applicator face plate unit.

5. A versatile combined grooming and treatment applicator assembly comprising:
    a housing having a hollow body for storing material to be applied to skin or hair;
    said housing including means for receiving alternative combined grooming and treatment applicator heads, and including openings directed to the receiving means for dispensing the treatment material;

a head for removably mounting on said housing, said head including means for engaging the hair of the subject to be treated and aperture means for supplying treatment material to said hair engaging means; said head being provided with actuator means for selectively aligning said aperture means with said openings for applying said treatment material, or shifting the position of said head to block the openings and the flow of the treatment material through said aperture means;

resilient means for sealing said holes when said holes are blocked; and means for removably supporting said head in movable engagement with said housing.

6. A versatile combined grooming and treatment applicator assembly as defined in claim 5 wherein said head is provided with bristles.

7. A versatile combined grooming and treatment applicator assembly as defined in claim 5 wherein said head is provided with a spongy surface.

8. A versatile combined grooming and treatment applicator assembly as defined in claim 5 further comprising strap means for assisting in holding said housing, and wherein means are provided for securing said strap to said housing.

9. A versatile combined grooming and treatment applicator assembly device as defined in claim 5 wherein said housing is at least partially flexible, whereby the treatment material may be urged out of said housing by squeezing the housing.

10. A versatile combined grooming and treatment applicator assembly device as defined in claim 5 wherein said housing includes an outwardly extending peripheral lip for assisting in the retention of said head.

11. A versatile combined grooming and treatment applicator assembly as defined in claim 5 wherein said housing is substantially circular.

12. A versatile combined grooming and treatment applicator assembly as defined in claim 11 wherein means are provided for mounting said head for rotation, and said actuator means is secured to the periphery of said head for manually rotating said head to selectively align said aperture means and openings or to block said openings.

13. A combined grooming and treatment applicator assembly, comprising:

a housing having a hollow body for storing material to be applied to skin or hair, said housing being substantially circular;

said housing including means for receiving a combined grooming and treatment applicator head;

a head for mounting on said housing, said head including means for engaging the hair of the subject to be treated and nozzle means extending substantially to the outer extent of the hair engaging means for applying the treatment material as the subject is being groomed;

means for rotatably mounting said head on said housing, and means for controlling the flow of treatment material from said housing through said nozzle means in accordance with the rotational position of said head with respect to said housing;

strap means for assisting in holding said housing; and means for securing said strap to said housing.

14. A combined grooming and treatment applicator assembly as defined in claim 13 wherein said head is provided with bristles.

15. A combined grooming and treatment applicator assembly as defined in claim 13 wherein said head is provided with a spongy surface.

16. A combined grooming and treatment applicator assembly device as defined in claim 13 wherein said housing is at least partially flexible, whereby the treatment material may be urged out of said housing by squeezing the housing.

17. A combined grooming and treatment applicator assembly device as defined in claim 13 further comprising vent means associated with said housing to facilitate flow through said nozzles.

* * * * *